United States Patent
Amit (10) Patent No.: US 10,114,759 B2
(45) Date of Patent: Oct. 30, 2018

(54) TRAPLESS SHADOW PAGE TABLES

(71) Applicant: VMware, Inc., Palo Alto, CA (US)

(72) Inventor: Nadav Amit, Mountain View, CA (US)

(73) Assignee: VMWARE, INC., Palo Alto, CA (US)

( * ) Notice: Subject to any disclaimer, the term of this patent is extended or adjusted under 35 U.S.C. 154(b) by 34 days.

(21) Appl. No.: 15/370,421

(22) Filed: Dec. 6, 2016

(65) Prior Publication Data

US 2018/0157596 A1 Jun. 7, 2018

(51) Int. Cl.
*G06F 12/10* (2016.01)
*G06F 9/455* (2018.01)
*G06F 12/1009* (2016.01)

(52) U.S. Cl.
CPC ...... *G06F 12/1009* (2013.01); *G06F 9/45558* (2013.01); *G06F 2009/45583* (2013.01); *G06F 2212/65* (2013.01)

(58) Field of Classification Search
CPC ............. G06F 9/45533; G06F 9/45541; G06F 9/45545; G06F 9/45558; G06F 2009/45583; G06F 12/1009; G06F 12/1018
See application file for complete search history.

(56) References Cited

U.S. PATENT DOCUMENTS

2009/0300263 A1* 12/2009 Devine ............... G06F 12/1009
711/6
2010/0250869 A1* 9/2010 Adams ................ G06F 12/1063
711/154
2013/0117743 A1* 5/2013 Neiger .................... G06F 9/455
718/1
2015/0134829 A1* 5/2015 Kruglick ............... G06F 3/0608
709/226
2018/0004954 A1* 1/2018 Liguori ................. G06F 21/575

OTHER PUBLICATIONS

Chen et al. "A Novel Hardware Assisted Full Virtualization Technique." Nov. 2008. IEEE. ICYCS 2008. pp. 1292-1297.*
Jin et al. "H-SVM: Hardware-Assisted Secure Virtual Machines under a Vulnerable Hypervisor." Oct. 2015. IEEE. IEEE Transactions on Computers. vol. 64. pp. 2833-2846.*
Muli Ben-Yehuda et al, "The Turtles Project: Design and Implementation of Nested Virtualization", Proceeding OSDI'10 Proceedings of the 9th USENIX Conference, Oct. 4, 2010, 14 pages.
Janeel Gandhi et al, "Agile Paging: Exceeding the Best of Nested and Shadow Paging", International Symposium on Computer Architecture (ISCA) 2016, Jun. 18-22, 2016, 12 pages.
Xiaolin Wang et al, "Selective Hardware/Software Memory Virtualization", International Conference on Virtual Execution Environments 2011, Mar. 9-11, 2011, 10 pages.

* cited by examiner

*Primary Examiner* — Nathan Sadler (57) ABSTRACT

Techniques for implementing trapless shadow page tables in a virtualized host system are provided. In one embodiment, an SPT accelerator device of the host system can intercept a memory write operation originating from a virtual machine (VM) and directed to a guest OS page table of the VM, where the guest OS page table is stored in a device memory of the SPT accelerator device. The SPT accelerator device can further extract a guest virtual address (GVA)-to-guest physical address (GPA) mapping in the memory write instruction and can translate the GVA-to-GPA mapping into a GVA-to-host physical address (HPA) mapping. The SPT accelerator device can then write the GVA-to-HPA mapping to a shadow page table of the host system.

18 Claims, 6 Drawing Sheets

TRAPLESS SHADOW PAGE TABLES

BACKGROUND

In a conventional bare-metal computer system that supports memory virtualization, the operating system (OS) running on the machine maintains a set of mappings between virtual memory addresses allocated to processes (e.g., applications) and physical memory addresses where data corresponding to the virtual memory addresses are stored, or configured to be stored, in physical system memory (e.g., RAM). These mappings are held in one or more data structures known as page tables. When a process wishes to read or write a piece of data to/from memory, the process issues a memory read/write instruction that identifies the virtual memory address of the data. This virtual memory address is passed to a memory management unit (MMU) of the system's CPU which translates, in hardware, the virtual memory address into a corresponding physical memory address based on the page table mappings. The CPU then uses the translated physical memory address to carry out the instruction against the system's physical memory.

In a virtualized host system comprising a hypervisor and one or more virtual machines (VMs), memory virtualization is more complex because the hypervisor usually provisions physical system memory among the VMs for various purposes (e.g., memory over-subscription, VM isolation, live migration, etc.). This memory provisioning by the hypervisor adds another level of indirection (and thus, another level of address translation) for memory operations. For example, consider the scenario shown in FIG. 1. In this example, hypervisor 100 has allocated some regions of the physical memory of the system (shown as host physical memory 102) to a VM 104 in the form of a contiguous guest physical memory 106. From the perspective of guest OS 108 running within VM 104, guest physical memory 106 appears to reflect the actual physical memory of the system, when it is in fact a virtual address range provisioned by hypervisor 100. Guest OS 108 has, in turn, allocated some regions of guest physical memory 106 to a process 110 in the form of a contiguous guest virtual memory 112.

Figure 1:
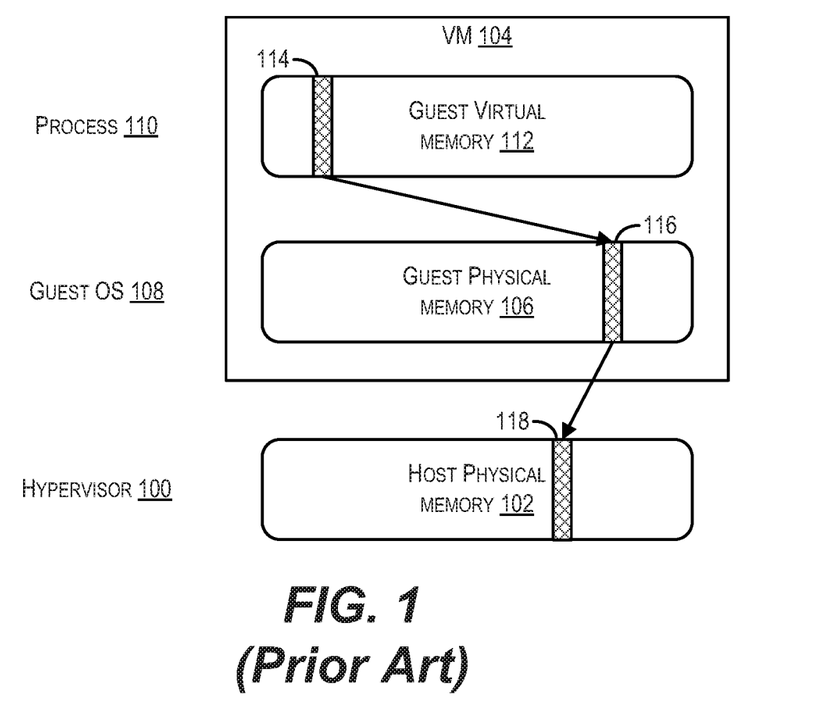
FIG. 1 illustrates the two levels of memory indirection that are typically found in a virtualized host system.

With the configuration shown in FIG. 1, when process 110 wishes to access data assigned to, e.g., a guest virtual memory address (GVA) 114, GVA 114 must first be translated into a guest physical memory address (GPA) 116 within guest physical memory 106 that is mapped to GVA 114. GPA 116 must then be translated into a host physical memory address (HPA) 118 within host physical memory 102 that is mapped to GPA 116. Once HPA 118 is determined, the system's CPU can carry out the requested memory instruction against host physical memory 102.

Figure 2:
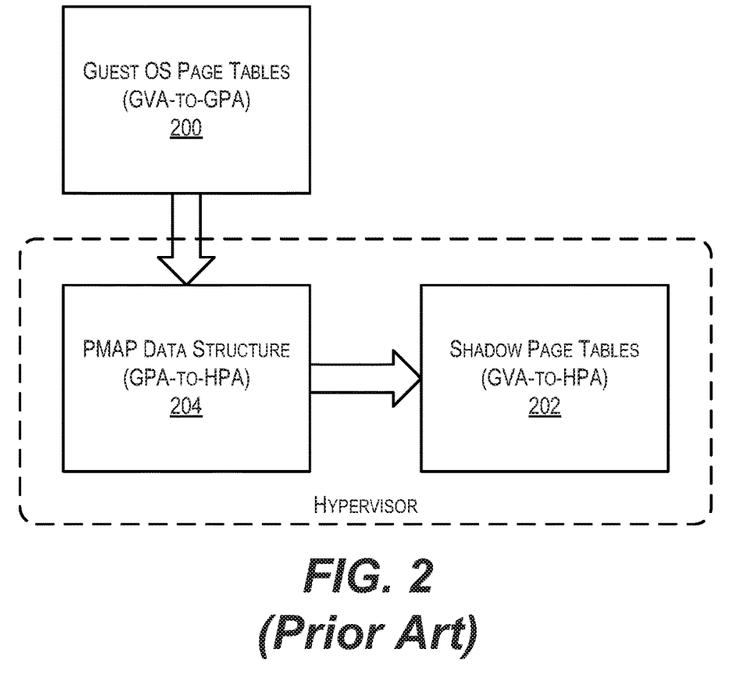
FIG. 2 illustrates data structures used in the conventional SPT approach.

One known approach for implementing the two-level memory address translation described above is referred to as the shadow page tables (SPT) approach and is illustrated in FIG. 2. In this approach, the guest OS of each VM maintains and updates guest OS page tables 200 (also known as emulated page tables) that comprise GVA-to-GPA mappings for that VM. Guest OS page tables 200 are conceptually similar to the conventional page tables maintained by the OS of a bare-metal (i.e., non-virtualized) computer system; however, unlike conventional page tables, guest OS page tables 200 are not used by the system's MMU to perform address translation. Instead, the MMU uses a set of shadow page tables 202 that are maintained by the hypervisor and that comprise GVA-to-HPA mappings derived from (1) the GVA-to-GPA mappings in guest OS page tables 200 and (2) GPA-to-HPA mappings maintained in, e.g., a "pmap" data structure 204. In order to ensure coherency between guest OS page tables 200 and shadow page tables 202, each time a VM issues an instruction to update a GVA-to-GPA mapping in a guest OS page table 200, the hypervisor traps the instruction, determines the GVA-to-GPA mapping that is being updated, translates the GPA into a corresponding HPA (using the GPA-to-HPA mappings in pmap data structure 204), and then writes the GVA-to-HPA mapping to shadow page tables 202.

Another known approach for implementing two-level memory address translation is referred to as the nested page tables (NPT) approach. In this approach, each VM maintains a first set of page tables comprising GVA-to-GPA mappings and the hypervisor maintains a second set of page tables comprising GPA-to-HPA mappings. The system's MMU traverses both sets of page tables upon each memory read or write in order to translate a GVA into a corresponding HPA that can be used to access host physical memory.

The main advantage of the SPT approach shown in FIG. 2 is that, since shadow page tables 202 store direct GVA-to-HPA mappings, the two memory address translations typically needed for each memory read/write instruction (i.e., GVA-to-GPA and GPA-to-HPA) are effectively collapsed into one (i.e., GVA-to-HPA). However, the hypervisor incurs non-negligible overhead each time it traps a VM-initiated modification of guest OS page tables 200 in order to synchronize the modification to shadow page tables 202. This overhead includes direct costs such as the CPU cycles needed to context switch from the VM to the hypervisor and back, as well as indirect costs that arise from, e.g., dirtied CPU caches and the like.

The main advantage of the NPT approach is that the hypervisor does not need to trap changes to the guest OS page tables as in the SPT approach. But, since the MMU must access two separate sets of page tables, address translations (i.e., page walks) will generally be more time consuming as they require more memory accesses. This problem is mitigated to an extent by the MMU's translation lookaside buffer (TLB), which the MMU uses to cache most recently accessed memory address mappings. However, the NPT approach will generally put more pressure on the TLB (i.e., fill it with more entries, causing older entries to be evicted faster), which increases the likelihood of TLB caches misses when compared to the SPT approach.

SUMMARY

Techniques implementing trapless shadow page tables in a virtualized host system are provided. In one embodiment, an SPT accelerator device of the host system can intercept a memory write operation originating from a virtual machine (VM) and directed to a guest OS page table of the VM, where the guest OS page table is stored in a device memory of the SPT accelerator device. The SPT accelerator device can further extract a guest virtual address (GVA)-to-guest physical address (GPA) mapping in the memory write instruction and can translate the GVA-to-GPA mapping into a GVA-to-host physical address (HPA) mapping. The SPT accelerator device can then write the GVA-to-HPA mapping to a shadow page table of the host system.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for implementing "trapless" shadow page tables in a virtualized host system. More particularly, these techniques enable the host system to use shadow page tables (which comprise GVA-to-HPA mappings) for memory address translation in a manner similar to the conventional SPT approach, but avoid the need for the system's hypervisor to trap VM-initiated modifications to guest OS page tables in order to synchronize those modifications with the shadow page tables. The hypervisor is said to "trap" such a VM-initiated modification if the modification triggers a CPU context switch from user mode (i.e., VM context) to kernel mode (i.e., hypervisor context). By avoiding these traps, the techniques of the present disclosure eliminate the context switching overhead associated with conventional SPT and thereby allow for more efficient memory address translation.

In one set of embodiments, to implement trapless shadow page tables, the host system can incorporate a novel hardware device referred to herein as an "SPT accelerator." The SPT accelerator can comprise (1) a device memory (separate from the host's system RAM) that is configured to store the guest OS page tables for each VM and (2) a device logic component. When a VM issues a write instruction with respect to a particular GVA-to-GPA mapping in its guest OS page tables, the device logic component of the SPT accelerator can intercept the instruction, without any intervention by the hypervisor. The device logic component can then determine a corresponding GVA-to-HPA mapping and write the GVA-to-HPA mapping to the shadow page tables of the system. In this way, the SPT accelerator can autonomously synchronize the guest OS page tables with the shadow page tables and thus eliminate the need for the hypervisor to trap each write to the guest OS page tables.

The foregoing and other aspects of the present disclosure are described in further detail in the sections that follow.

2. Example Host System and High-Level Design

Figure 3:
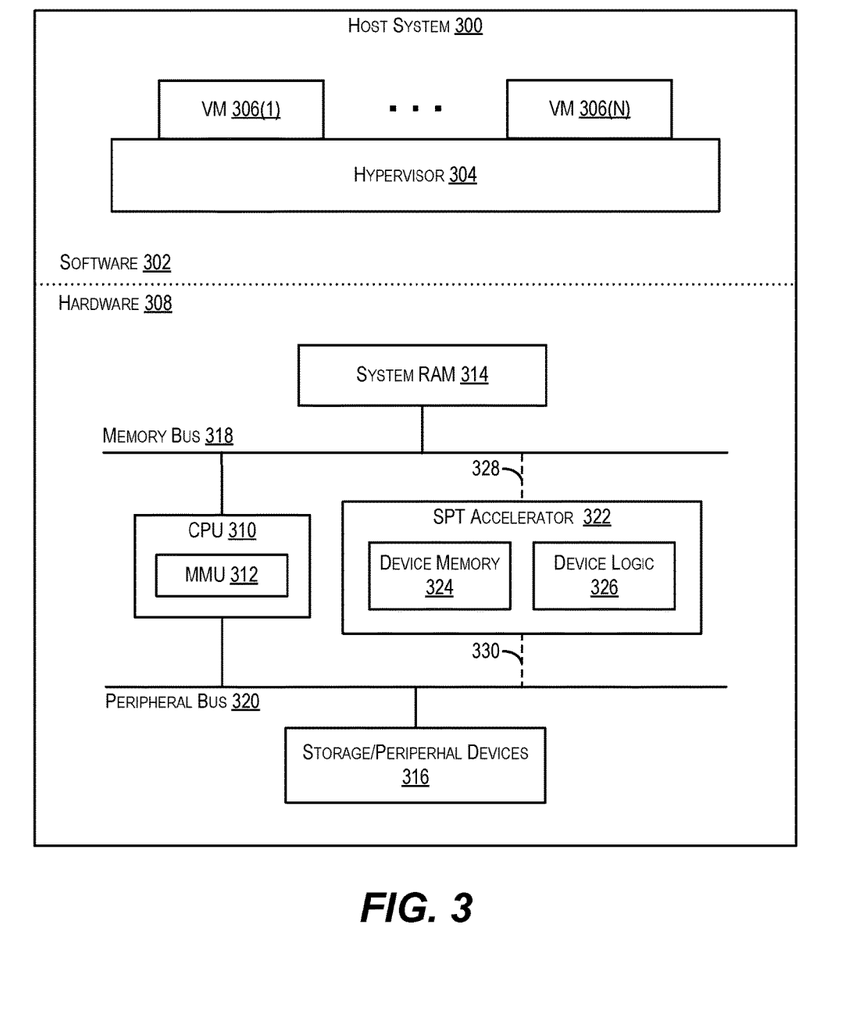
FIG. 3 depicts a simplified block diagram of an example host system according to an embodiment.

FIG. 3 depicts an example host system 300 in which embodiments of the present disclosure may be implemented. As shown, host system 300 includes a software layer 302 that comprises a hypervisor 304 and one or more VMs 306(1)-(N). Each VM will generally include a guest OS and one or more guest applications (not shown) that execute on top of virtual hardware exposed and provisioned by hypervisor 304. Hypervisor 304 can be implemented using any hypervisor or similar hardware abstraction platform known in the art, such as VMware Inc.'s ESXi.

In addition to software layer 302, host system 300 includes a physical hardware layer 308 comprising a central processing unit (CPU) 310 (with MMU 312), system RAM 314, and one or more storage/peripheral devices (e.g., block-based storage, network interface card, etc.) 316. CPU 310 is connected with system RAM 314 via a memory bus 318 and with storage/peripheral devices 316 via a peripheral bus (e.g., PCI-e) 320.

As noted in the Background section, in a virtualized system such as host system 300, VM memory operations generally involve two address translations: a first translation from guest virtual address (GVA) to guest physical address (GPA) and a second translation from guest physical address (GPA) to host physical address (HPA). This is because the guest OS of each VM implements one level of memory indirection to support legacy memory virtualization and the hypervisor implements another level of memory indirection to support per-VM memory provisioning.

With the conventional SPT approach, this two-level address translation is accomplished using (1) guest OS page tables that are stored in system RAM and updated by the guest OS of each VM, and (2) shadow page tables that are stored in system RAM and updated by the hypervisor. The guest OS page tables store GVA-to-GPA mappings for their respective VMs, but these mappings are not actually used by the system's MMU for address translation. Instead, the CPU monitors for changes to the guest OS page tables in system RAM and, when such changes are detected (i.e., trapped), the hypervisor updates the GVA-to-HPA mappings in the shadow page tables, which are used by the MMU. Since the shadow page tables effectively collapse two levels of address translation (i.e., GVA-to-GPA and GPA-to-HPA) into one (i.e., GVA-to-HPA), this approach is more performant, from a page walk perspective, than alternative approaches such as NPT. However, as mentioned previously, the need to trap every modification to the guest OS page tables incurs a non-negligible performance overhead.

To address this issue, host system 300 of FIG. 3 is enhanced to include a novel hardware device (i.e., "SPT accelerator") 322 comprising a device memory 324 and a device logic 326. In one embodiment, SPT accelerator 322 can be implemented using a custom dual inline memory module (DIMM) that is connected to memory bus 318 of host system 300 via, e.g., link 328. In another embodiment, SPT accelerator 322 can be implemented using a field programmable gate array (FPGA) with embedded memory that is connected to peripheral bus 320 of host system 300 via, e.g., link 330. In yet other embodiments, SPT accelerator 322 can be implemented using any other type of hardware that is capable of performing the functions attributed to accelerator 322 in this disclosure.

Generally speaking, SPT accelerator 322 can take over the functions performed by the system CPU and hypervisor in conventional SPT for synchronizing the guest OS page tables and the shadow page tables. By relieving the CPU/hypervisor of this duty, SPT accelerator 322 can enable a new, "trapless" SPT model. For example, as shown in the high-level diagram of FIG. 4, device memory 324 of SPT accelerator 322 can be configured to store the guest OS page tables (400) of VMs 306(1)-(N); this is in contrast to the conventional SPT approach, where the guest OS page tables are stored in system RAM (i.e., RAM 314). In a particular embodiment, this can be achieved by using memory mapped I/O (MMIO) to map the region(s) of system RAM that are allocated to the guest OS page tables to an address space in device memory 324.

Further, each time the guest OS of a given VM 306 issues a memory write instruction for updating a GVA-to-GPA mapping in guest OS page tables 400, device logic 326 of SPT accelerator 322 can (1) intercept the instruction (step 402), (2) compute a GVA-to-HPA mapping based on the GPA (using, e.g., pmap data structure 204 shown in FIG. 2) (step 404), and (3) update the system's shadow page tables with the new GVA-to-HPA mapping (step 406), thereby bringing the shadow page tables in sync with the guest OS page tables. Since steps 402-406 are performed by device logic 326 of SPT accelerator 322, the hypervisor does not need to trap the memory write instruction. As a result, the undesirable overhead associated with such traps (i.e., context switching overhead between VM and hypervisor) in conventional SPT is eliminated. At the same time, this trapless SPT model preserves the performance advantages of conventional SPT over NPT, such as fewer page walks/memory accesses per TLB miss, and thus provides an overall superior solution for memory address translation. Additional details for implementing the high-level design shown in FIG. 4 are described in sections (3) and (4) below.

Figure 4:
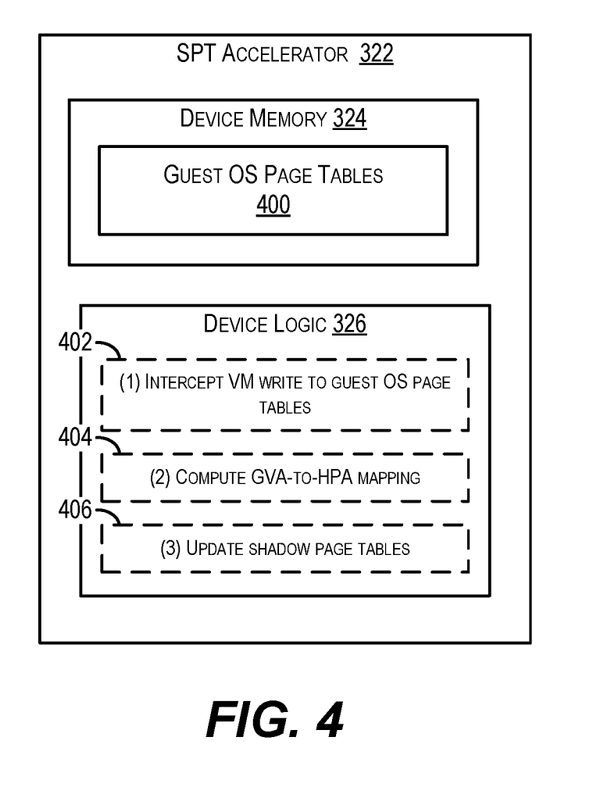
FIG. 4 depicts the high-level design of an SPT accelerator according to an embodiment.

It should be appreciated that FIGS. 3 and 4 are illustrative and not intended to limit embodiments of the present invention. For example, the various entities shown in these figures may be arranged according to different configurations or may include functions or subcomponents not explicitly described. One of ordinary skill in the art will recognize other variations, modifications, and alternatives.

3. Configuration Workflow

Figure 5:
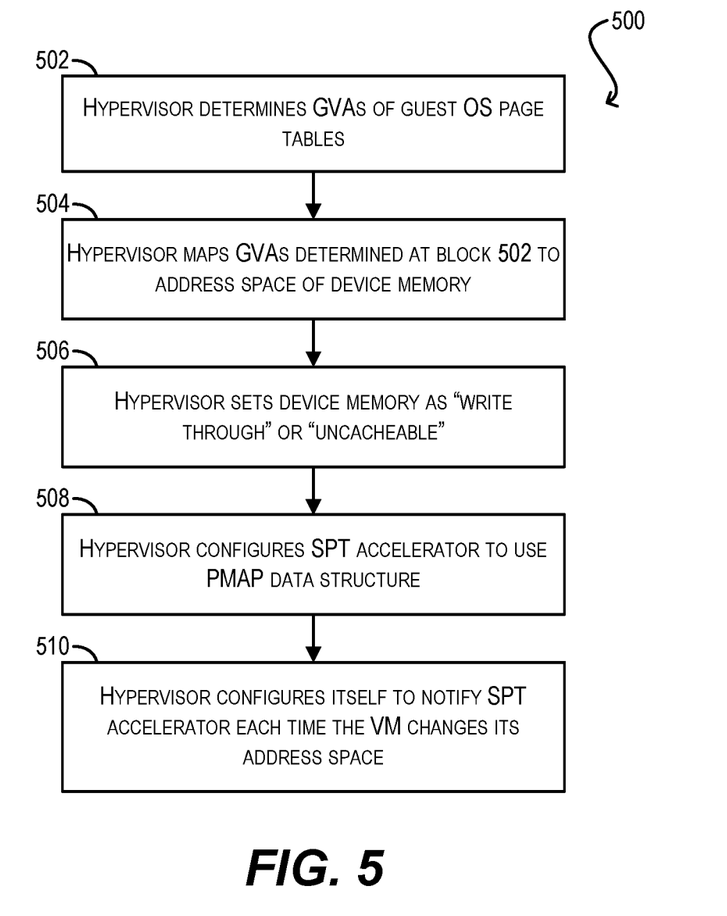
FIG. 5 depicts a workflow for configuring the SPT accelerator of FIG. 4 according to an embodiment.

FIG. 5 depicts an initial workflow 500 that can be executed by hypervisor 304 of FIG. 3 for configuring SPT accelerator 322 to perform its assigned task of synchronizing the contents of guest OS page tables 400 (as stored in device memory 324) with the shadow page tables of host system 300 according to an embodiment. It is assumed that workflow 500 is performed with respect to a particular VM 306 running on host system 300 (and thus can be repeated for multiple VMs as needed).

Starting with block 502, hypervisor 304 can determine, for VM 306, the guest virtual addresses (GVAs) that have been allocated for the guest OS page tables of the VM. Stated another way, hypervisor 304 can determine what portions of the VM's guest virtual address space have been reserved for storing the VM's guest OS page tables. In one embodiment, hypervisor 304 can perform this step by monitoring requests generated by the guest OS of VM 306 for creating/allocating new guest OS page tables. In another embodiment, hypervisor 304 can perform this step by tracking prior memory operations issued by the VM that indicate reads or writes to its guest OS page tables.

At block 504, hypervisor 304 can map the guest OS page table GVAs determined at block 502 to an address space in device memory 324 of SPT accelerator 322 (rather than an address space in system RAM 314). In this way, hypervisor 304 can ensure that future memory operations directed to the VM's guest OS page tables are passed to, and stored in, device memory 324. As mentioned previously, this mapping can be implemented using memory mapped I/O (i.e., mapping the region(s) of system RAM that are allocated for the guest OS page tables via MMIO to device memory 324). Alternatively, this mapping can be implemented by manipulating the GVA-to-HPA mappings in the shadow page tables that correspond to the guest OS page table GVAs to point to physical addresses in device memory 324.

At block 506, hypervisor 304 can configure the device memory that has been mapped at block 504 to operate in a "write through" or "uncacheable" mode. This ensures that memory writes made to the guest OS page tables are immediately written through to device memory 324 (i.e., are not exclusively held in one or more CPU caches in a "write back" manner for some period of time). This step is needed because, if updated GVA-to-GPA mappings are not immediately propagated to device memory 324, SPT accelerator 322 will not be able to synchronize the changes to the system's shadow page tables in real-time, which can lead to runtime memory exceptions/errors.

At block 508, hypervisor 304 can configure SPT accelerator 322 to have access to the pmap data structure (shown in FIG. 2) that stores GPA-to-HPA mappings. This pmap data structure is typically stored in system RAM 314. In one embodiment, hypervisor 304 can copy the pmap data structure from system RAM 314 to a portion of device memory 324 so that SPT accelerator 322 can access it directly. In another embodiment, hypervisor 304 can inform SPT accelerator 322 of the location (i.e., physical memory address) of the pmap data structure in system RAM 314 so that accelerator 322 can access it via direct memory access (DMA) each time it is needed.

Finally, at block 510, hypervisor 304 can configure itself to notify SPT accelerator 322 each time VM 306 changes its active guest virtual address space (e.g., switches from the GVA range used by one process to the GVA range used by another process). This notification is needed so that SPT accelerator 322 can know what is the current active GVA range and thus which of the shadow page tables (which may be partitioned on a per-process basis) needs to be updated at a given point in time. In cases where the hypervisor supports paravirtualization, this notification may be performed by a paravirtualization driver running within the VM.

4. Synchronization Workflow

Figure 6:
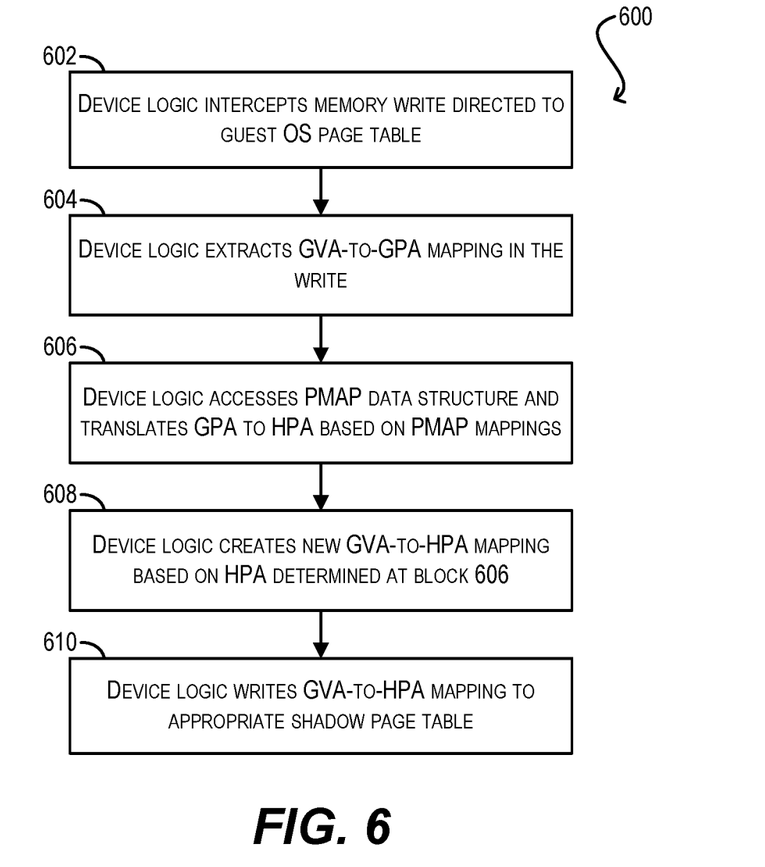
FIG. 6 depicts a workflow executed by the SPT accelerator of FIG. 4 for synchronizing a VM-initiated modification of a guest OS page table to a shadow page table according to an embodiment.

FIG. 6 depicts a workflow 600 that can be executed by device logic 326 of SPT accelerator 322 for processing a VM-initiated modification to a guest OS page table stored in device memory 324 (and thereby synchronizing the modification to a corresponding shadow page table) according to an embodiment. As mentioned previously, SPT accelerator 322 can perform this workflow without requiring the system CPU to trap the modification and switch context from the VM to the hypervisor, thereby avoid the overhead associated with this context switch.

Starting with block 602, device logic 326 can intercept a memory write instruction issued by a VM 306 that is directed to a guest OS page table of the VM (as stored in device memory 324). Note that such instructions will be automatically picked by SPT accelerator 322 by virtue of the memory mapping described at block 504 of FIG. 5.

At block 604, device logic 326 can extract from the instruction the GVA-to-GPA mapping that is being written. Device logic 326 can then consult pmap data structure 204 and translate the GPA to a corresponding HPA based on the pmap mappings (block 606). In cases where pmap data structure 204 is stored in system RAM 314, device logic 326 can employ DMA to access the data structure.

At block 608, device logic 326 can create a new GVA-to-HPA mapping using the HPA determined at block 606. Finally, at block 610, device logic 326 can write the GVA-to-HPA mapping to the appropriate shadow page table of the system, thereby bring the shadow page table in sync with the guest OS page table.

It should be noted that the shadow page tables of the system can reside either in system RAM 314 (as in the conventional SPT approach) or in device memory 324 of SPT accelerator 322. In the scenario where the shadow page tables are in system RAM 314, device logic 326 can use DMA to write the GVA-to-HPA mapping to the appropriate shadow page table at block 610. In this case, the system CPU executing the VM may need to block until the DMA write is completed to ensure that the shadow page table is successfully updated before another memory access is processed. In the scenario where the shadow page tables are in device memory 324, device logic 326 can directly update the device memory.

It should also be noted that, in certain embodiments, device logic 326 of SPT accelerator 322 can perform synchronization in the opposite direction (i.e., from the shadow page tables to the guest OS page tables). For example, if the system CPU makes changes to any of the status bits (e.g., access and dirty) in the shadow page tables, device logic 326 can detect these changes and copy them over to the guest OS page tables.

Certain embodiments described herein involve a hardware abstraction layer on top of a host computer. The hardware abstraction layer allows multiple containers to share the hardware resource. These containers, isolated from each other, have at least one application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Further embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for implementing trapless shadow page tables, the method comprising:
   intercepting, by a shadow page tables (SPT) accelerator device of a host system, a memory write operation originating from a virtual machine (VM) and directed to a guest OS page table of the VM, the guest OS page table being stored in a device memory of the SPT accelerator device, the device memory being physically separate from a system memory of the host system;
   extracting, by the SPT accelerator device, a guest virtual address (GVA)-to-guest physical address (GPA) mapping in the memory write instruction;
   translating, by the SPT accelerator device, the GVA-to-GPA mapping into a GVA-to-host physical address (HPA) mapping; and
   writing, by the SPT accelerator device, the GVA-to-HPA mapping to a shadow page table of the host system.

2. The method of claim 1 wherein the SPT accelerator device is a logic device that is physically separate from the host system's central processing unit (CPU).

3. The method of claim 1 wherein the intercepting, the extracting, the translating, and the writing are performed without requiring the host system's CPU to switch context from the VM to a hypervisor of the host system.

4. The method of claim 1 wherein, prior to the intercepting, a hypervisor of the host system is configured to:
   determine one or more GVAs pointing to the guest OS page table in the host system's system memory; and
   map the one or more GVAs to an address space of the device memory.

5. The method of claim 4 wherein the hypervisor is further configured to:
   configure the SPT accelerator device to access a pmap data structure comprising GPA-to-HPA mappings, the pmap data structure being used by the SPT accelerator device to translate the GVA-to-GPA mapping into the GVA-to-HPA mapping.

6. The method of claim 1 wherein the shadow page table is also stored in the device memory of the SPT accelerator device.

7. A non-transitory computer readable storage medium having stored thereon program code executable by a host system, the program code embodying a method for implementing trapless shadow page tables, the method comprising:
   intercepting, by a shadow page tables (SPT) accelerator device of the host system, a memory write operation originating from a virtual machine (VM) and directed to a guest OS page table of the VM, the guest OS page table being stored in a device memory of the SPT accelerator device, the device memory being physically separate from a system memory of the host system;
   extracting, by the SPT accelerator device, a guest virtual address (GVA)-to-guest physical address (GPA) mapping in the memory write instruction;
   translating, by the SPT accelerator device, the GVA-to-GPA mapping into a GVA-to-host physical address (HPA) mapping; and
   writing, by the SPT accelerator device, the GVA-to-HPA mapping to a shadow page table of the host system.

8. The non-transitory computer readable storage medium of claim 7 wherein the SPT accelerator device is a logic device that is physically separate from the host system's central processing unit (CPU).

9. The non-transitory computer readable storage medium of claim 7 wherein the intercepting, the extracting, the translating, and the writing are performed without requiring the host system's CPU to switch context from the VM to a hypervisor of the host system.

10. The non-transitory computer readable storage medium of claim 7 wherein, prior to the intercepting, a hypervisor of the host system is configured to:
    determine one or more GVAs pointing to the guest OS page table in the host system's system memory; and
    map the one or more GVAs to an address space of the device memory.

11. The non-transitory computer readable storage medium of claim 10 wherein the hypervisor is further configured to:
    configure the SPT accelerator device to access a pmap data structure comprising GPA-to-HPA mappings, the pmap data structure being used by the SPT accelerator device to translate the GVA-to-GPA mapping into the GVA-to-HPA mapping.

12. The non-transitory computer readable storage medium of claim 7 wherein the shadow page table is also stored in the device memory of the SPT accelerator device.

13. A host system comprising:
    a hypervisor;
    a system memory;
    a virtual machine (VM) running on top of the hypervisor;
    a shadow page tables (SPT) accelerator device including a device memory that is physically separate from the system memory; and
    a non-transitory computer readable medium having stored thereon program code that, when executed by the SPT accelerator device, causes the SPT accelerator device to:
       intercept a memory write operation originating from the VM and directed to a guest OS page table of the VM, the guest OS page table being stored in the device memory of the SPT accelerator device;
       extract a guest virtual address (GVA)-to-guest physical address (GPA) mapping in the memory write instruction;
       translate the GVA-to-GPA mapping into a GVA-to-host physical address (HPA) mapping; and
       write the GVA-to-HPA mapping to a shadow page table.

14. The host system of claim 13 wherein the SPT accelerator device is a logic device that is physically separate from a central processing unit (CPU) of the host system.

15. The host system of claim 13 wherein the intercepting, the extracting, the translating, and the writing are performed without requiring the host system's CPU to switch context from the VM to the hypervisor.

16. The host system of claim 13 wherein, prior to the intercepting, the hypervisor is configured to:
    determine one or more GVAs pointing to the guest OS page table in the host system's system memory; and
    map the one or more GVAs to an address space of the device memory.

17. The host system of claim 16 wherein the hypervisor is further configured to:
- configure the SPT accelerator device to access a pmap data structure comprising GPA-to-HPA mappings, the pmap data structure being used by the SPT accelerator device to translate the GVA-to-GPA mapping into the GVA-to-HPA mapping.

18. The host system of claim 13 wherein the shadow page table is also stored in the device memory of the SPT accelerator device.

* * * * *